United States Patent [19]
Cheung

[11] Patent Number: 5,039,295
[45] Date of Patent: Aug. 13, 1991

[54] APPARATUS FOR FORMING VISCOUS FLOWABLE MATERIAL INTO SPECIFIC SHAPES

[76] Inventor: Yau Tak Cheung, 2348 S. Canal St., Chicago, Ill. 60616

[21] Appl. No.: 588,541

[22] Filed: Sep. 25, 1990

[51] Int. Cl.⁵ .......................... A21C 5/06; B29C 43/34
[52] U.S. Cl. ................................... 425/241; 452/174
[58] Field of Search ............... 452/174; 425/238, 239, 425/241

[56] References Cited

U.S. PATENT DOCUMENTS

| | | | |
|---|---|---|---|
| 1,088,532 | 2/1914 | Callow | 425/241 |
| 1,788,330 | 1/1931 | Ross | 425/239 |
| 2,539,319 | 1/1951 | Oyer | 425/240 |
| 2,651,808 | 9/1953 | Burnett et al. | 425/241 |
| 4,828,863 | 5/1989 | Aoki | 425/239 |
| 4,913,043 | 4/1990 | Cheung | 425/110 |

FOREIGN PATENT DOCUMENTS

| | | | |
|---|---|---|---|
| 532918 | 2/1922 | France | 425/241 |
| 123325 | 11/1927 | France | 425/241 |
| 1220598 | 3/1986 | U.S.S.R. | 425/240 |

*Primary Examiner*—Willard E. Hoag
*Attorney, Agent, or Firm*—Kinzer, Plyer, Dorn, McEachran & Jambor

[57] ABSTRACT

An apparatus for forming viscous flowable material, such as meat and food, into specific shapes such as meatballs and cylindrical fillings for egg rolls. The apparatus includes a container having side walls and a curved pressure plate positioned between the side walls. A rotor is located between the side walls and it has a rim facing the curved, adjustable pressure plate so that the rim and the pressure plate converge in the direction of rotation of the rotor to define a flow channel of decreasing volume for the viscous flowable material. A motor is provided to rotate the rotor in the direction of convergence with the adjustable pressure plate. Scrapers are carried by the rotor to force the viscous material flow into the channel toward the convergence of the rotor and the pressure plate to compress the viscous flowable material. A mold cavity is provided located relative to the rotor rim and the pressure plate to receive the viscous flowable material from the flow channel. This mold cavity can either be carried in the rim of the rotor or it can be located in the pressure plate near the convergence of the pressure plate and the rotor.

7 Claims, 5 Drawing Sheets

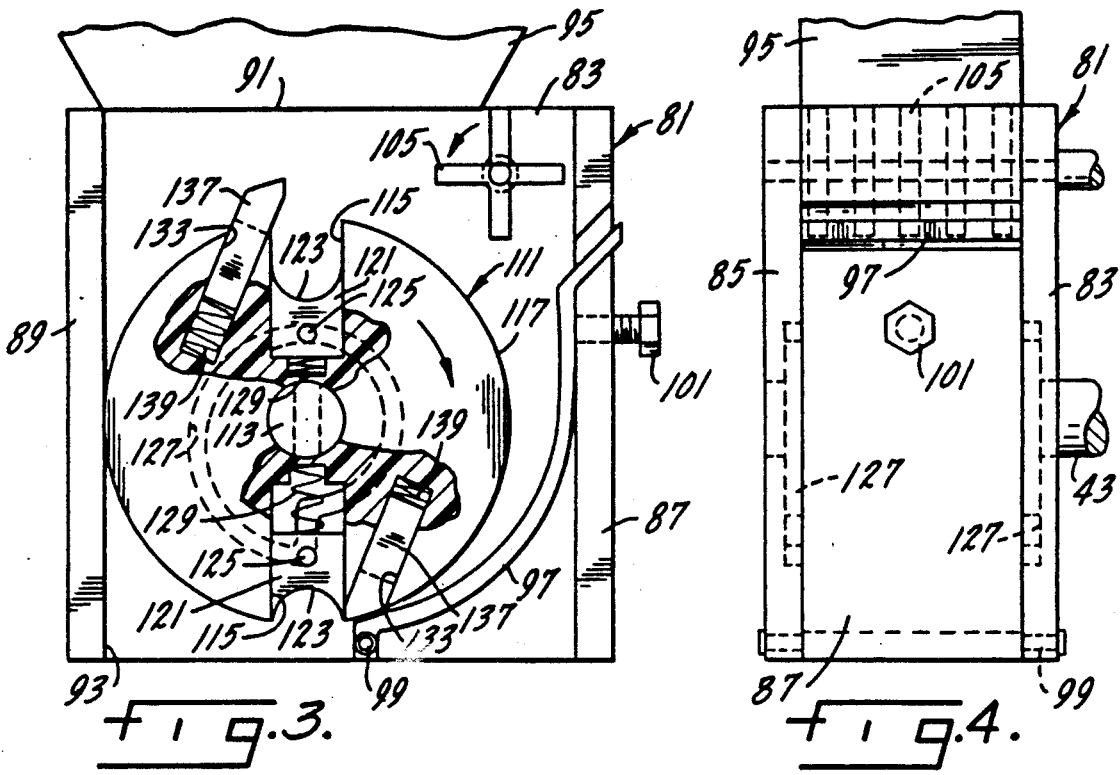
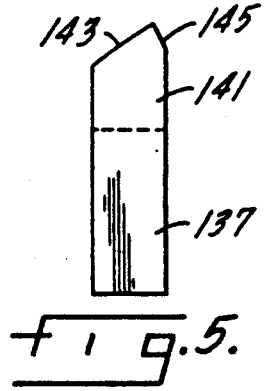
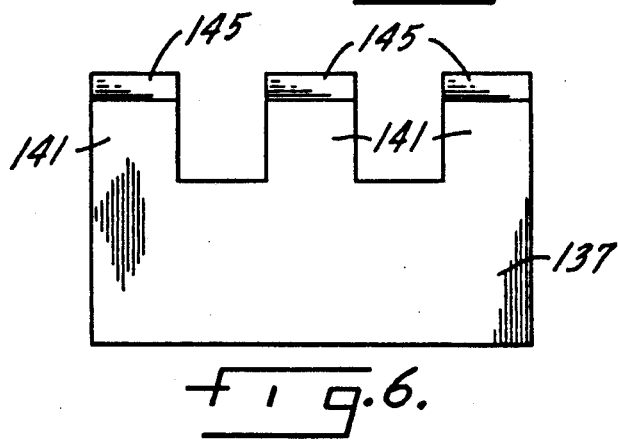
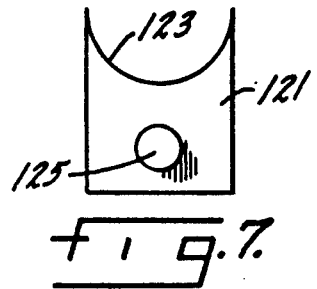
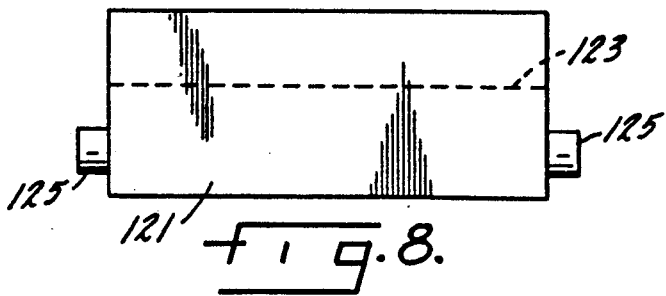

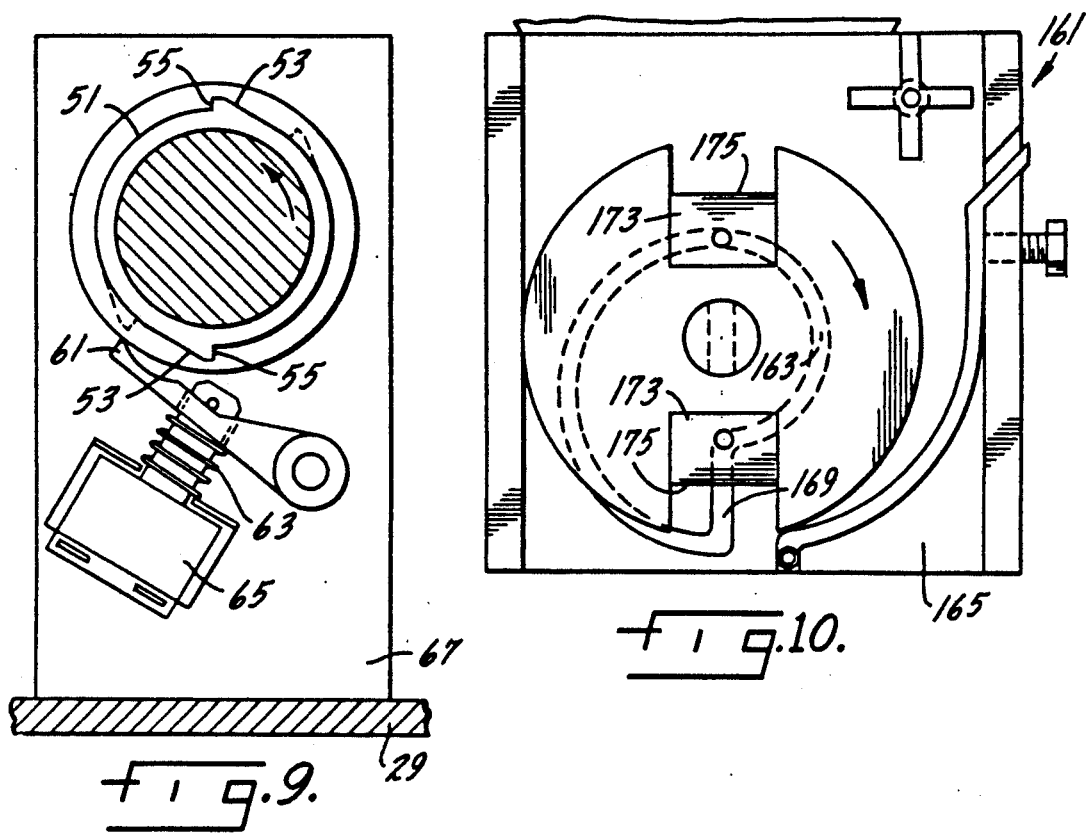
Fig. 9.
Fig. 10.
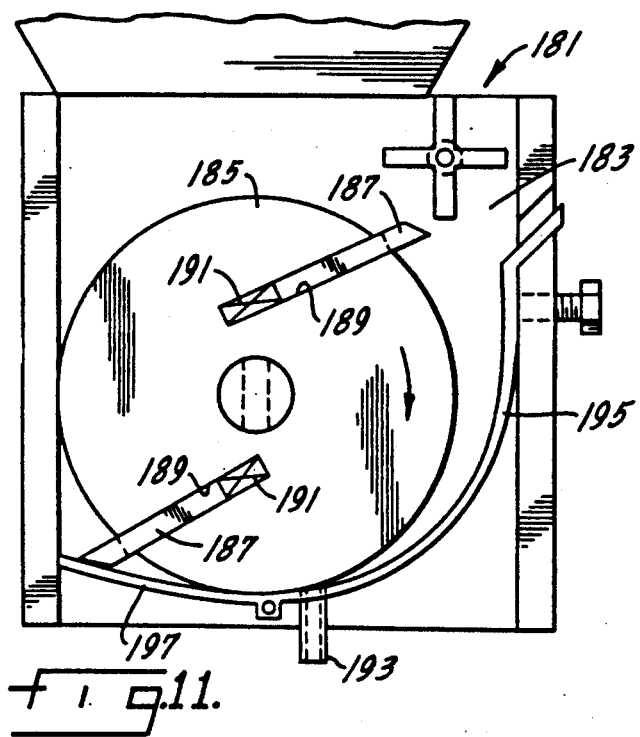
Fig. 11.

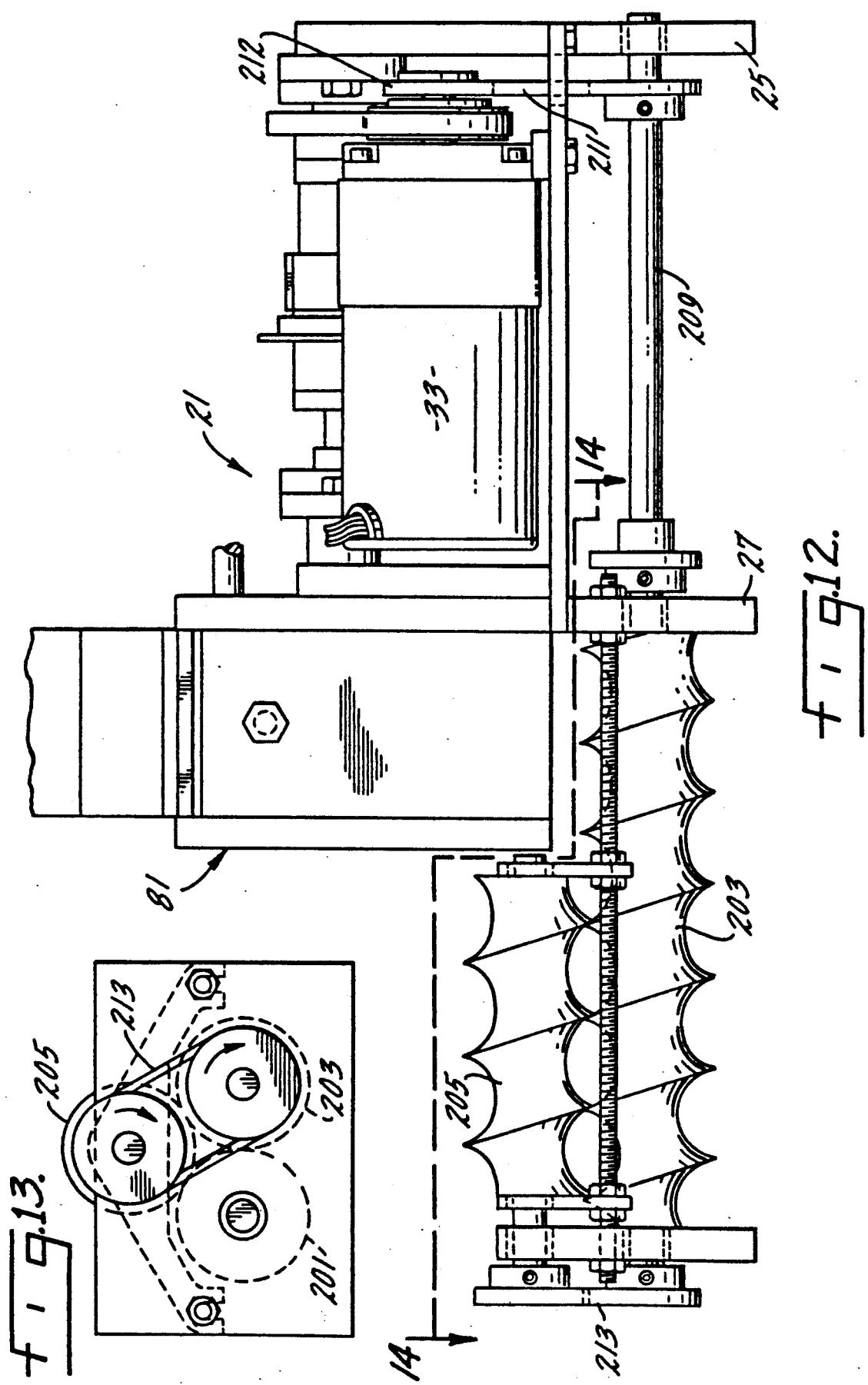

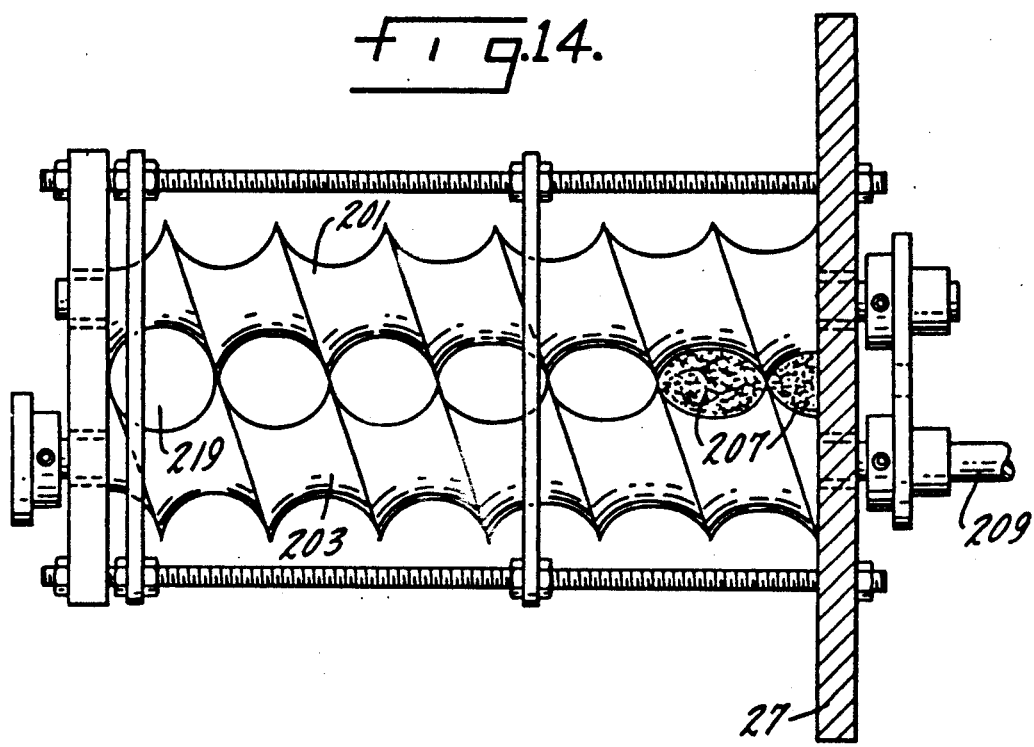
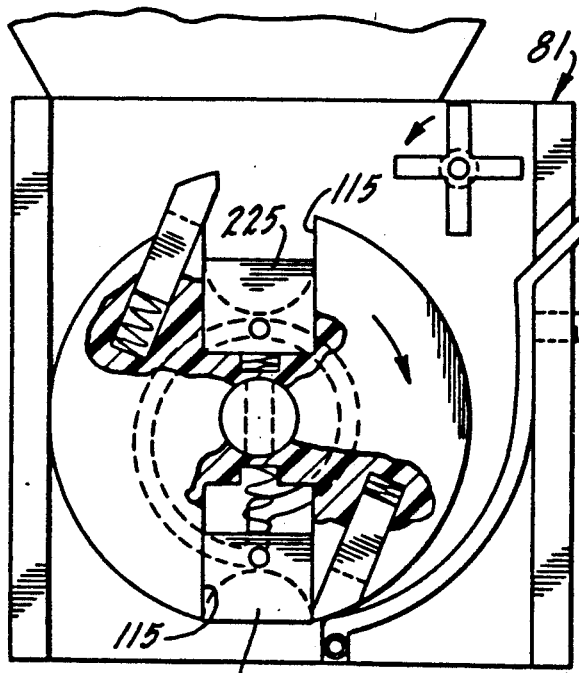
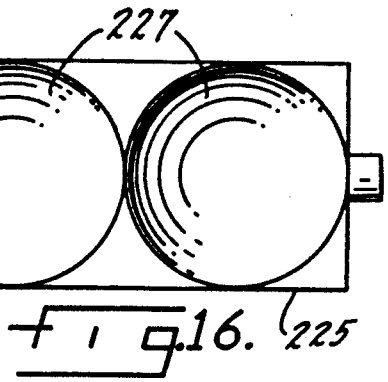
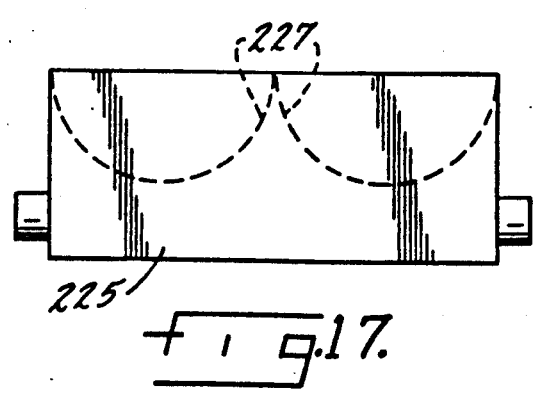

APPARATUS FOR FORMING VISCOUS FLOWABLE MATERIAL INTO SPECIFIC SHAPES

BACKGROUND AND SUMMARY OF THE INVENTION

My invention is directed to a mechanism for automatically and rapidly forming food items such as meatballs and fillings for egg rolls. Because these items are formed from viscous flowable materials such as chopped and shredded meats and vegetables, it should be apparent that my mechanism is also capable of forming other types of viscous flowable materials into desired shapes.

The principal object of my invention is a mechanism that can automatically and rapidly form food items into practically any desirable shape, with the shape of possible items being limited only by the availability of a mold for the desired shape.

Accordingly, another object of my invention is a mechanism that can be used to form a substantially cylindrical-shaped egg roll filling and automatically feed it to an egg roll forming mechanism of the type shown in my U.S. Pat. No. 4,913,043, issued Apr. 3, 1990. Specifically, a cylindrical egg roll filling may be delivered from the mechanism of my present invention onto the square sheet of dough in the second step of the method described in my issued patent.

Still another object of my invention is a mechanism using molds to form the shaped items, which molds may be easily changed so as to create different shaped items using the same forming mechanism.

Yet another object of my invention is a mechanism that molds viscous flowable materials, such as meat and foods, into irregularly-shaped items and then finishes the irregularly-shaped items into spheres.

Other objects of my invention may be found in the following specification, claims and drawings.

BRIEF DESCRIPTION OF THE DRAWINGS

The invention is described more or less diagrammatically in the following drawings wherein:

FIG. 3 is a partial, cross-sectional view taken along line 3—3 of FIG. 1;

FIG. 4 is a partial, end elevational view of the mechanism of FIG. 3;

FIG. 5 is an enlarged end elevational view of a scraper of the type shown in the mechanism of FIG. 3;

FIG. 6 is a side elevational view of the scraper of FIG. 5 drawn to the same scale as FIG. 5;

FIG. 7 is an enlarged, end elevational view of a cylindrical mold of the type shown in the mechanism of FIG. 3;

FIG. 8 is a side elevational view of the mold of FIG. 7, drawn to the same scale as FIG. 7;

FIG. 9 is an enlarged view taken along line 9—9 of FIG. 2;

FIG. 10 is an end elevational view, with the outer wall removed, of a modified mold of the type shown in FIG. 3;

FIG. 11 is an end elevational view, with the outer wall removed, of another modified mold similar to that shown in FIG. 3;

FIG. 12 is a partial, side elevational view of the molding apparatus of my invention with an attached screw conveyor mechanism for forming-shaped spherical products;

FIG. 13 is an end elevational view of the mechanism of FIG. 12;

FIG. 14 is a view taken along line 14—14 of FIG. 12, with the top screw of the conveyor removed;

FIG. 15 is an end elevational view, with the end wall removed, of a molding mechanism similar to that shown in FIG. 3 of the drawings;

FIG. 16 is an enlarged, top plan view of a mold of the type shown in FIG. 15; and FIG. 17 is a side elevational view of the mold of FIG. 16, drawn to the same scale.

DESCRIPTION OF THE PREFERRED EMBODIMENTS

Figure 1:
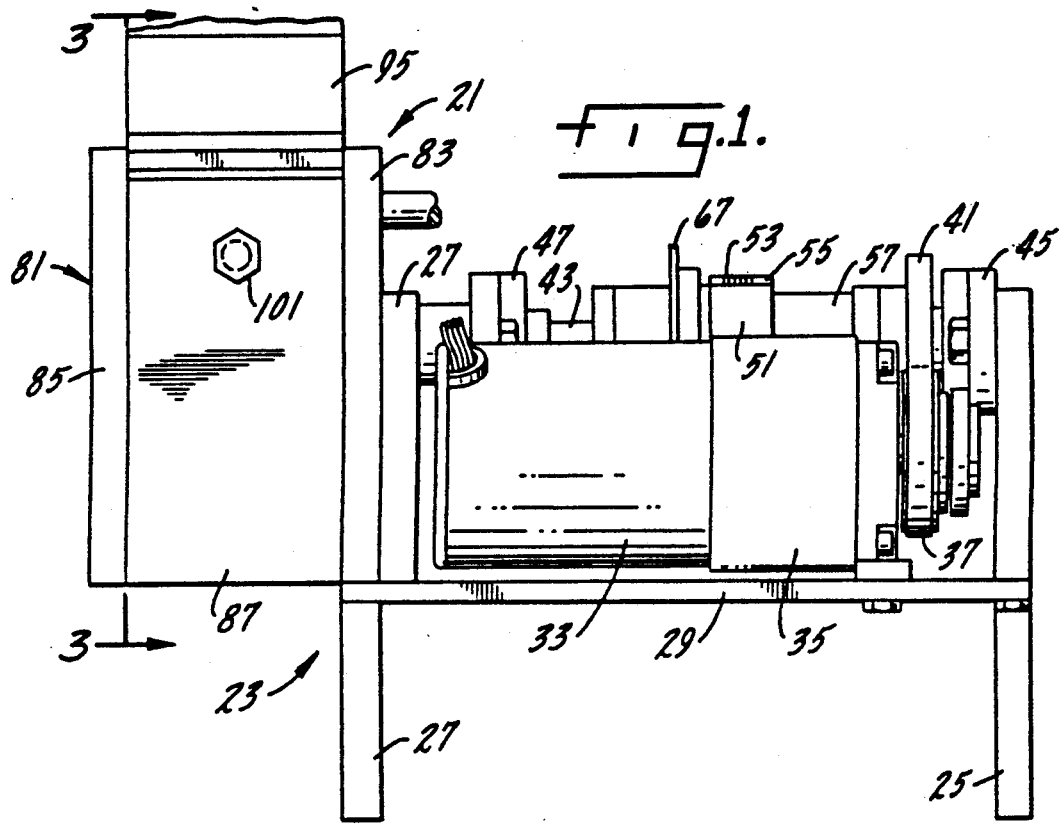
FIG. 1 is partial, side elevational view of the molding apparatus of my invention.

Referring now to FIGS. 1-9 of the drawings, a first embodiment of the apparatus of my invention, which embodiment is adapted for forming fillings for egg rolls, is shown. My apparatus 21 for molding cylindrical egg roll fillings includes a support structure 23 formed of stainless steel and having end walls 25 and 27 supporting an intermediate platform 29. End wall 27 has an upper portion which is laterally offset relative to its lower portion.

Mounted on the intermediate platform 29, between the end walls 25 and 27, is an electric drive motor 33. A speed reduction gear 35 is connected to the output of the electric motor and a sprocket 37 provides the output from the reduction gear. A drive chain 39 connects the speed reduction gear output sprocket 37 to a sprocket 41 on a shaft 43. The shaft 43 is journaled in bearings (not shown) located in bearing housings 45 and 47, mounted respectively on the end walls 25 and 27 of the support structure 23.

Mounted on the shaft 43 is a cam 51 having a pair of diametrically-located lobes 53, with each lobe having a detent 55, as shown most clearly in FIG. 9 of the drawings. A spring clutch 57 is operatively connected between the sprocket gear 41 and the cam 51. A pivotally-mounted pawl 61, shown in FIG. 9 of the drawings, is biased by a spring 63 into contact with the cam 51 to detain the cam in either one of two positions of rotation defined by the detents 55. A suck-in solenoid 65 mounted on a upright 67, which stands upright on the intermediate platform 29, pulls the pawl 61 away from engagement with a detent 55 on the cam 51. The solenoid 65, when energized, moves the pawl 61 momentarily out of contact with the cam 51 to permit the shaft 43 to be rotated by the continuously driven sprocket gear 41 approximately 180 degrees to a position at which the pawl engages the other detent 55.

Figure 2:
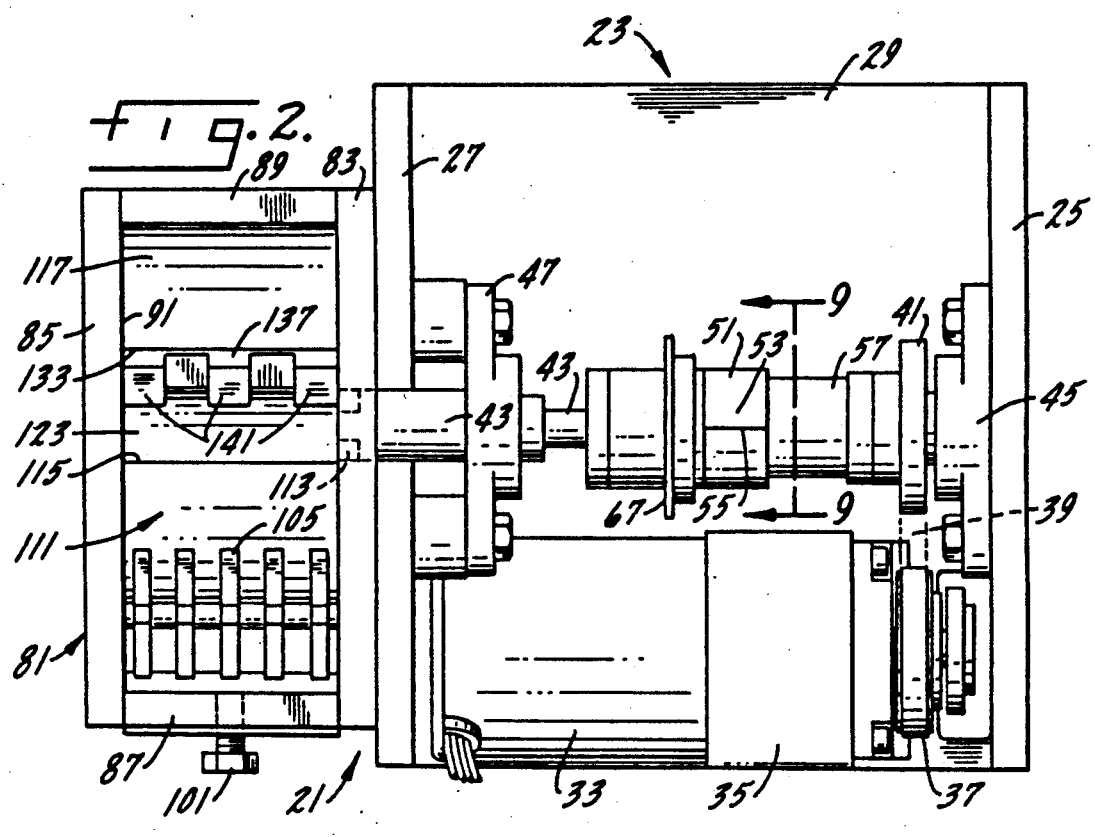
FIG. 2 is a top plan view of the molding apparatus of FIG. 1.

A mold housing 81 is supported on the intermediate platform 29 of the support structure 23 at the end thereof adjacent end wall 27, as shown in FIGS. 1 and 2 of the drawings. The mold housing is formed of nylon side walls 83 and 85, end walls 87 and 89 also made of nylon, with an open top 91 and an open bottom 93. A hopper 95 is mounted on the top of the housing. A curved end wall 97, preferably formed of stainless steel, is pivotally mounted on shaft 99 extending between the side walls 83 and 85. A turn screw 101 extends through end wall 87 to movably adjust the curved end wall 97 toward and away from end wall 87. A bladed paddle 105 is mounted in the housing at the top thereof, near the end wall 87, and rotates in a counterclockwise direction as viewed in FIG. 3 of the drawings.

A stainless steel rotor 111 is mounted in the mold housing 81 on a horizontally-extending shaft 113 that is splined to and forms an extension of the driven shaft 43 previously described. A pair of diametrically-located, longitudinally-extending cavities 115 are formed in the rotor 111 and extend through the rim 117 of the rotor. Located in each cavity is a piston 121 having a concave head 123. Guide pins 125, formed on the opposite ends of the piston, ride in grooves 127 formed in the side walls 83 and 85 of the mold housing to move the piston heads radially inwardly and outwardly as the rotor rotates in the mold housing. Springs 129 bias the pistons radially outwardly of the rotor with the movement of the rotor restrained by engagement of the guide pins 125 with the cam grooves 127.

Additional cavities 133 are formed in the rotor with one cavity formed adjacent to each piston cavity 115 and rearwardly thereof in the direction of rotation of the rotor, as viewed in FIG. 3 of the drawings. The cavities 133 extend nonradially relative to the rotor and intersect the rim adjacent to the piston cavities, as shown in FIG. 3.

A nylon scraper 137 is positioned in each cavity 133 with the scrapers being biased outwardly by springs 139. As can be seen in FIG. 6 of the drawings, each scraper has a plurality of teeth 141. Each tooth has flattened edges 143 and 145 for engaging the end wall 89 of the housing and the movable end wall 97. The flattened edge 143 also engages a piston 121 when it is at the bottom of its cycle to prevent the scraper from falling out of its cavity. Each scraper 137 moves between an extended position at the top of the rotor and retracted position at the bottom of the rotor, as viewed in FIG. 3 of the drawings. When it is in its extended position, shown in FIG. 3, the scraper forces meat and other material into the cavity 115 to help fill the concave head 123 of the piston 121.

The mold housing 161, shown in FIG. 10 of the drawings, is similar to the mold housing 81 with the following differences. The cam grooves 163 formed in the side walls 165 are formed with a greater drop 169. The greater drop is necessary because the pistons 173 have flat heads 175 rather than the concave heads 123 of the pistons 121 of the previous embodiment. The greater drop provides better ejection of the molded product when the flat head piston 173 is utilized.

Another embodiment of the invention is shown in FIG. 11 of the drawings. In this embodiment, the mold housing 181 is similar to mold housing 81 but the side walls, for example side wall 183, does not have cam grooves. Also, the rotor 185 does not have pistons or piston cavities but instead has a pair of diametrically, oppositely-located scrapers 187 which are located in cavities 189 and are biased outwardly by springs 191. A filling tube 193 for the product is located at the convergence of the rotor 185 and the adjustable end wall 195, with the scrapers 187 functioning to move the meat into the convergence as the rotor rotates in a clockwise direction, as viewed in FIG. 11, to force the meat into the filling tube 193. The meat forced into the filling tube 193 can be shaped and further processed a it leaves the tube 193. The adjustable end wall 195 has an extension 197 which prevents the scrapers 187 from falling out of the rotor 185.

A modified form of my invention for producing meatballs of spherical shape is shown in FIGS. 12-17 of the drawings. This modified apparatus is similar to the apparatus for forming egg roll fillings, shown in FIGS. 1-9 of the drawings, with the modifications to be hereinafter described and explained. One major modification is the attachment of driven helical screws 201, 203 and 205 to the apparatus 21, with the screws being located at the outlet of the mold housing 81. The helical screws are formed of nylon or other plastic material and have identical pitch of sufficient width to receive an irregularly-formed meatball 207 which is discharged from the mold housing 81. Helical screws 201 and 203 are located side-by-side and extend under the discharge of the mold housing 81, while shorter helical screw 205 is mounted above the screws 201 and 203 and is located entirely outwardly of the mold housing 81, as shown most clearly in FIG. 12 of the drawings. The helical screws are chained to turn in the same direction of rotation, as viewed in FIG. 13, with the screw 201 turning slightly faster than the screws 203 and 205 to prevent the irregularly-shaped meatballs 207 from falling between the screws. The screws are rotated by means of a shaft 209, which is driven by a drive chain 211, which connects to a sprocket 212 driven by the electric drive motor 33. Helical screw 205 is driven from screw 203 by a drive chain 213, as shown mos clearly in FIG. 13 of the drawings.

As shown in FIGS. 12 and 14 of the drawings, the meatballs 207 leaving the mold housing 81 are not perfectly spherical in shape. They are deposited at the juncture of the helical screws 201 and 203 and as they move toward the discharge of the screws 201 and 203, to the left, as shown in FIGS. 12 and 14 of the drawings, they are rolled into spherical shapes. The top helical screw 205 presses down on the meatballs to establish the spherical shape and the spherical-shaped meatballs are discharged at the outlet end 219 of the helical screw conveyor.

In order to form the irregularly-shaped meatballs 207, the following modifications are made. As most clearly shown in FIGS. 15-17 of the drawings, modified pistons 225 are installed in the cavities 115 of the rotor 111. These pistons, as shown enlarged in FIGS. 16 and 17 of the drawings, have a pair of hemispherical cavities 227. Thus, as each of the pistons discharges at the lower opened end of the housing, as shown in FIG. 15, two partially-formed, irregularly-shaped meatballs 207 are dropped onto the helical screws 201, 203 where they are conveyed to the outlet end 219 of the screw conveyor, each arriving in a spherical form. The change of form of the meatballs 207 as they move down the screw conveyor can be observed most clearly in FIG. 14 of the drawings.

I claim:

1. An apparatus for forming viscous flowable material into specific shapes, said apparatus including:
    a container having side walls and a curved pressure plate positioned between said side walls,
    a rotor positioned between said side walls and having a rim facing said curved pressure plate so that said rim and said pressure plate converge in the direction of rotation of said rotor to define a flow channel of decreasing volume for the viscous flowable material,
    means to rotate said rotor in the direction of convergence with said pressure plate,
    means carried by said rotor to force said viscous flowable material to flow into said channel toward said convergence of said rotor and said pressure plate to compress said viscous flowable material, and a mold cavity located within to said rotor rim and said pressure plate to receive the viscous flowable material from said channel.

2. The apparatus of claim 1 in which said pressure plate is mounted for swinging movement toward and away from said rim of said rotor.

3. The apparatus of claim 1 in which at least one scraper is mounted on said rotor and is biased to project beyond the rim of the rotor when the rotor is moving through said flow channel and to be restricted by engagement with the pressure plate as the scraper reaches the convergence of the pressure plate and the rotor.

4. The apparatus of claim 3 in which said pressure plate extends beyond the convergence with the rotor to continue to engage said scraper.

5. The apparatus of claim 1 in which said mold cavity is formed in said rim of said rotor, a piston is mounted in said mold cavity for reciprocal radial movement toward and away from said rim, and cam and cam follower means are operatively connected to said piston to move said piston between a filling position and a discharge position during rotation of said rotor.

6. The apparatus of claim 5 including a scraper mounted behind said mold cavity with said scraper biased to project beyond the rim of the rotor at the start of the filling position of the mold cavity and to be retracted by engagement with the pressure plate before the mold cavity reaches its discharge position.

7. The apparatus of claim 5 in which said piston has a surface facing said rim and said surface is concave.

* * * * *